3,331,845
1-SUBSTITUTED-4-SUBSTITUTED AMINO
ALKYLENE PIPERAZINES
Andrew Stephen Tomcufcik, Old Tappan, N.J., Paul Frank
Fabio, Pearl River, N.Y., and Arlene M. Hoffman,
Park Ridge, N.J., assignors to American Cyanamid
Company, Stamford, Conn., a corporation of Maine
No Drawing. Filed June 17, 1966, Ser. No. 558,232
9 Claims. (Cl. 260—268)

This application is a continuation-in-part of our copending application Ser. No. 379,714, filed July 1, 1964 which in turn is a continuation-in-part of copending application Ser. No. 270,537, filed Apr. 4, 1963, both now abandoned.

This invention relates to new organic compounds. More particularly, it relates to 1-substituted-4-methyl-aminopropyl piperazines and methods of preparing the same.

The novel piperazines of the present invention may be illustrated as follows:

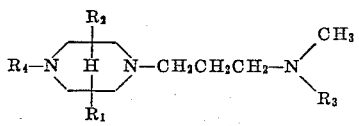

wherein $R_1$ and $R_2$ are selected from the group consisting of hydrogen and lower alkyl, $R_3$ is selected from the group consisting of alkyl of 1 to 8 carbon atoms, lower alkylphenyl and cyclohexyl, $R_4$ is a substituted aryl radical of the benzene series and pharmaceutically acceptable acid addition salts such as hydrochlorides, sulfates, maleates, fumarates, and 1,1'-methylene-bis(2-naphthol-3-carboxylates).

The substituted aryl radicals may be, for example, nitrophenyl, dinitrophenyl, trinitrophenyl, aminophenyl, nitrocarbomethoxyphenyl, nitronaphthyl, nitro lower alkylphenyl, acetamidophenyl, acetamido lower alkylphenyl, acetamidonaphtyl, acetamidocarbomethoxyphenyl, chloroacetamidophenyl, dichloroacetamidophenyl, trichloroacetamidophenyl, lauramidophenyl, carb lower alkoxyamidophenyl, benzamidophenyl, phenyltriazolecarboxamidophenyl, maleamidophenyl, benzenesulfonamidophenyl, methanesulfonamidophenyl, naphthalenesulfonamidophenyl, dichlorobenzenesulfonamidophenyl, trichlorobenzenesulfonamidophenyl, tetrachlorobenzenesulfonamidophenyl, aminobenzenesulfonamidophenyl, nitrobenzenesulfonamidophenyl, nitrochlorobenzenesulfonamidophenyl, thiocarbanilide, carbanilide, and phenylurea.

The free bases of the above compounds are, in general, oils or lower melting solids, relatively insoluble in water, but soluble in lower alkanols, benezene, tolune, acetone, chloroform or the like. The salts of the above compounds are characteristically soluble in water and other hydroxylated solvents and are usually insoluble in nonpolar solvents.

The new compounds of the present invention may be prepared by several methods, the most important of which are as follows:

(1) A number of the compounds can be prepared by reacting a substituted aryl halide with an ω-disubstituted aminotrimethylene piperazine as follows:

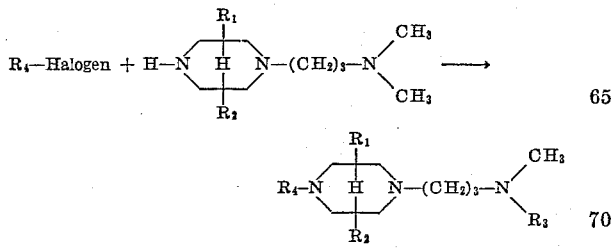

in the above reaction $R_1$, $R_2$, $R_3$, and $R_4$ are as hereinbefore defined. The above reaction is usually carried out in a solvent such as, for example, a β-alkoxy alkanol, a lower alkanol, tetrahydrofuran, phenol or the like. The reaction is usually carried out by heating the reaction mixture in the presence of an acid acceptor such as a bicarbonate, triethylamine or the like.

(2) The present compounds are also prepared by reacting an aryl substituted piperazine with an ω-disubstituted aminotrimethylene halide. This reaction may be illustrated as follows:

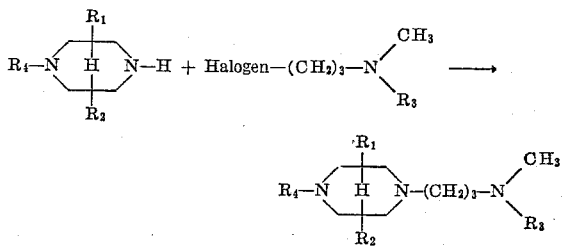

In the above reaction $R_1$, $R_2$, $R_3$, and $R_4$ are as hereinbefore defined. The above reaction is usually carried out in a solvent such as a lower alkanol or the like by heating the reaction mixture in the presence of an acid acceptor such as a lower alkoxide or a carbonate or bicarbonate.

(3) The present compounds can be prepared by treating a 1-substituted aryl-4-ω-hydroxytrimethylene piperazine with a halogenating agent such as, for example, thionyl chloride, phosphorous oxychloride, phosphorous oxybromide, alkylsulfonyl chloride, arylsulfonyl chloride or the like and subsequently reacting the intermediate 1-substituted aryl-4-ω-halo, alkylsulfonyloxy or alkylsulfonylaoxy trimethylene with a primary or secondary amine in the presence of an acid acceptor. This reaction may be illustrated as follows:

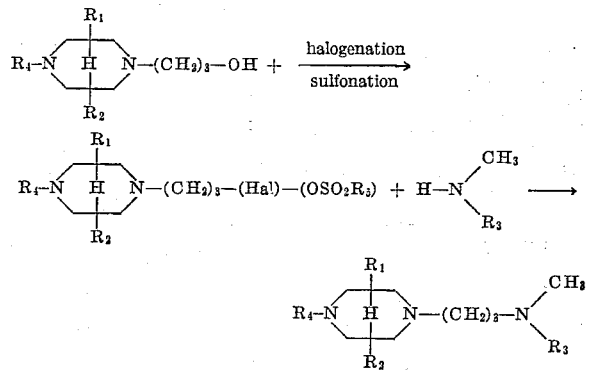

wherein $R_1$, $R_2$, $R_3$, and $R_4$ are as defined above and $R_5$ is alkyl or aryl. The above halogenation or sulfonation is usually carried out in a solvent and the subsequent amination is preferably carried out in a solvent in the presence of an acid acceptor.

(4) The compounds of the present invention can be prepared by reacting a substituted aryl amine with a substituted diethylamino propyl amine which can be illustrated as follows:

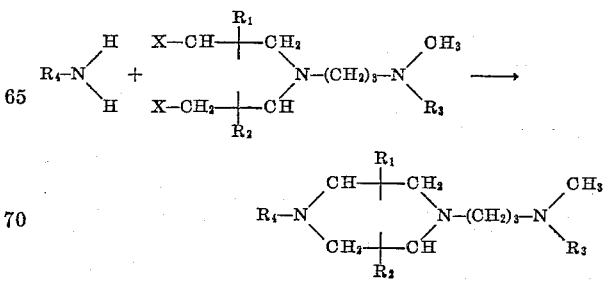

wherein $R_1$, $R_2$, $R_3$ and $R_4$ are as hereinbefore defined and X is halogen, alkylsulfonyloxy or arylsulfonyloxy. The reaction is preferably carried out in a solvent such as a lower alkanol or β-alkoxyalkanol by heating the reaction mixture.

(5) The compounds of the present invention can be prepared by reacting an ω-(n-methyl-N-alkyl)amino propylamine with an N,N-di(2-haloalkyl)aromatic amine derivative as follows:

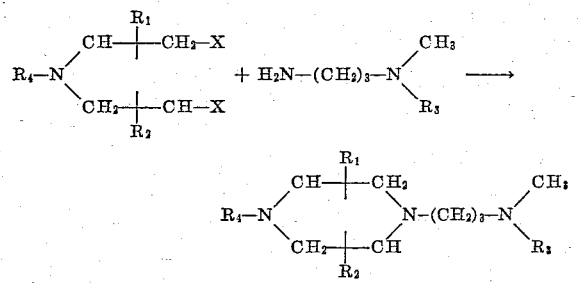

wherein $R_1$, $R_2$, $R_3$, $R_4$, and X are as herein before defined. The reaction is preferably carried out in a solvent such as a lower alkanol or β-alkoxyalkanol by heating the reaction mixture.

(6) A 1-substituted aryl-4-ω-halopropionyl piperazine is treated with a primary or secondary amine

wherein $R_3$ is as defined hereinbefore and the resulting product is then reduced by suitable procedures to give compounds as described in paragraph (1).

(7) The compounds of the present invention can also be prepared by the reduction of intermediates of the general structure:

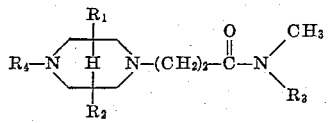

wherein $R_1$, $R_2$, $R_3$, and $R_4$ are as hereinabove defined.

(8) The present compounds can be prepared in some instances where $R_4$ is aminophenyl by reacting with acid chlorides or anhydrides as follows:

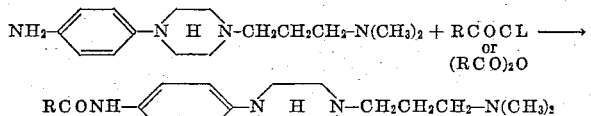

(9) The compounds of this invention when $R_4$ is aminophenyl can be further substituted by reaction with a sulfonyl halide as follows:

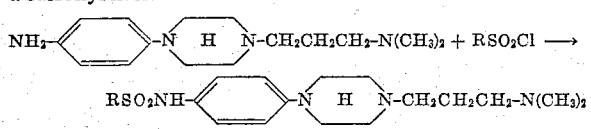

(10) The compounds where $R_4$ is aminophenyl can be further reacted to produce the corresponding alkylcarbonylamino, alkyl thiocarbonylamino and the corresponding alkylamino derivatives as follows:

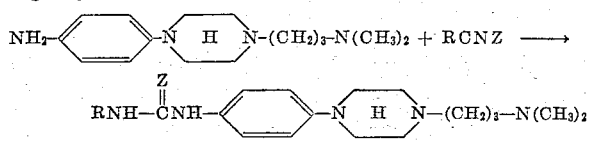

wherein Z is oxygen or sulfur.

The compounds of the present invention are active in inhibiting the growth of protozoa of the genus Trypanosoma, different species of which are known to be the causative agent of serious parasitic diseases in man and animals (e.g. Trypanosomiasis or "sleeping sickness"). The compound 1 - (4-acetamidophenyl)-4-(3-dimethylaminopropyl)piperazine, for example, has been found to be active against experimental infections with *Trypanosoma cruzi* in mice. *Trypanosoma cruzi* is the causative agent of Chagas' disease in South America, an American trypanosomiasis.

The strain of *Trypanosoma cruzi* used in the testing data hereinafter is the "B" strain, originally isolated from a Brazilian patient. It was obtained from the National Institutes of Health in 1948, and has been maintained by mouse to mouse passage since that time.

The drug-diet method of administering treatment was employed in the tests described herein. The compounds were mixed with standard ground rations to provide the dose levels listed in the table. Groups of 7 to 10 mice were employed, and the individual daily food consumption was calculated from the total group consumption over the entire period. The mice were weighed individually on days 6, 8, and 12 post-inoculation and mg./kg./day dosage of the compounds was calculated from the mean weights of the mice during the treatment period and the daily food consumption. Final calculations of dosage were expressed in terms of the base contents of the compounds.

In all cases treatment was administered from day 6 to 12 inclusive after subcutaneous inoculations with approximately 50,000 parasites per mouse. Haemocytometer counts made of diluted heart blood from infected donors (approximately 1:9, blood:physiological saline solution) and this dilution was adjusted further until volumes of inoculum (0.2 ml.) containing the approximate number of parasites desired. The surviving mice were observed for 30 days post-inoculation (approximately three weeks after the last treatment day). The principal criterion of therapeutic efficacy was the prolongation of survival times in the treated groups as compared with the untreated controls.

The following Table I summarizes dosage and survival time of representative compounds tested.

TABLE I $R_4-N\underset{\phantom{H}}{\phantom{H}}H\underset{\phantom{H}}{\phantom{H}}N-(CH_2)_3-N(CH_3)_2$

| $R_4{}^a$ | Dosage of Base, mg./kg./day | Median Range Survival Time (Days) |
|---|---|---|
| 4-nitrophenyl [b] | 26 | >25 |
| 4-acetamidophenyl | 1.6 | 25 |
| 4-benzamidophenyl | 1.4 | 24 |
| 4-acetamido-3-methylphenyl | 1.7 | 21 |
| 4-nitro-1-naphthyl | 16 | 16 |
| 2-acetamido-4-carbomethoxyphenyl | 9 | 23 |
| 4-acetamido-1-naphthyl | 1 | 21.5 |
| 4-benzenesulfonamidophenyl | 1.4 | >30 |
| 4-carbethoxyaminophenyl | 1.5 | 24 |
| 4[2-phenyl-2H-1,2,3-triazole-4-carbonamido]phenyl | 13.5 | >30 |
| 4-[2-naphthalenesulfonamido]phenyl | 1.1 | 22 |
| 4-aminophenyl [c] | 12.6 | >30 |
| Compound CL 19,486 [d] | 25 | 14 |
| Compound CL 19,535 [d] | 28 | 12.5 |
| Controls (untreated) X | | 12–14.5 |

Compound CL 19,486 is 1-[β-(N-phenyl-N-ethylamino)ethyl]-4-phenyl-piperazine hydrochloride.
Compound CL 19,535 is 1-[β-(N-phenyl-N-ethylamino)ethyl]-4-p-chlorophenylpiperazine hydrochloride.
X values during thirteen screening runs involving compounds of Table I. This range has been observed in over fifty different screening runs during the past two years.

[a] All tested as dimaleate salt except where indicated.
[b] Dihydrochloride.
[c] Tetrahydrochloride.
[d] Monohydrochloride.

The following Table II summarizes dosage and survival time of compounds wherein $R_3$ is various substituents.

TABLE II

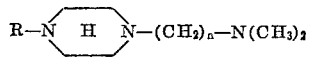

| R₃ | Dosage of Base, mg./kg./day | Median Range Survival Time (Days) |
|---|---|---|
| CH₃ | 1.6 | 25 |
| CH₂CH₃ | 10 | 27 |
| (CH₂)₂CH₃ | 2 | >60 |
| (CH₂)₃CH₃ | 6 | >60 |
| CH₂CH(CH₃)₂ | 26 | >60 |
| (CH₂)₄CH₃ | 2 | >60 |
| (CH₂)₅CH₃ | 24 | >60 |
| (CH₂)₇CH₃ | 24 | >40 |
| CH₂C₆H₅ | 24 | 21 |
| CH₂CH₂C₆H₅ | 3 | 27 |
| CH₂—⟨H⟩ | 20 | >60 |
| Controls | | 12–14.5 |

NOTE.—All compounds were tested as the dimaleate salts.

Direct comparisons of compounds where $n$ is 2 and $n$ is 3 in the formula below are summarized in Table III as follows:

TABLE III $$R-N\underset{\diagup}{\overset{\diagdown}{H}}N-(CH_2)_n-N(CH_3)_2$$

| Rᵃ | n | Dosage of Base, mg./kg./day | Median Range Survival Time (Days) |
|---|---|---|---|
| 4-nitrophenyl | 2 | 46 | 13 |
| Do.ᵇ | 3 | 26 | >25 |
| 4-acetamidophenyl | 2 | 40 | 14 |
| Do | 3 | 1.6 | 25 |
| 4-chlorophenyl | 2 | 50 | [13] |
| Do | 3 | 7 | 24 |
| 4-methoxyphenyl | 2 | 50 | [13] |
| Do | 3 | 4 | 23 |
| 3-methylphenyl | 2 | 50 | [13] |
| Do | 3 | 16 | >30 |
| Controls (untreated) | | | 12–14.5 |

ᵃ All tested as dimaleate salts except where indicated.
ᵇ Dihydrochloride.

The substituted piperazines described above may be dispensed as the active ingredient in compositions of the compound and an edible carrier. While the amount of drug to be given daily will depend on many factors such as size, weight, age, etc. of the warm-blooded animal, it has been found that a daily intake of from 10 mg. to 400 mg./kg. of body weight will produce good results. The dosage unit may be in a form for a single unit per day, or smaller forms for use as multiple units per day. In the case of tablets, they may be of larger size, scored for use as fractional units one or more times per day.

The compositions can be dispensed in the form of soft or hard shell gelatin capsules. Also present in the capsules may be diluents such as lactose, starch, magnesium oxide, magnesium stearate and the like. The capsules may be large enough to provide the desirable daily dosage or smaller to be used in multiple doses per day.

The compositions may be dispensed as parenteral solutions or suspensions. If larger doses in small amounts are desirable it may be in some cases be necessary to use parenteral suspenions.

The compositions of the present invention may take the form of syrups or pediatric drops. Such formulations usually contain one or more of the following suspending agents, buffer salts, stabilizers, preservatives, etc.

The following examples describe in detail the preparation of representative substituted piperazines of the present invention.

EXAMPLE 1

*Preparation of 1-(3-dimethylaminopropyl)-4-(4-methoxyphenyl)- piperazine dimaleate*

A mixture of 25.0 g. (0.094 mole) of 1-(4-methoxyphenyl)piperazine dihydrochloride, 18.6 g. (0.118 mole) of 3-dimethylaminopropyl chloride hydrochloride, 33.6 g. (0.4 mole) of sodium bicarbonate, and 200 ml. of methyl cellosolve is stirred at reflux for 24 hours. The inorganic salts are removed by filtration and the filtrate stripped of solvent at the water pump. The residual oil is taken up in 100 ml. of benzene and the solution is washed with two 25 ml. portions of water. After drying, the benzene is removed under reduced pressure. The residual oil, in 200 ml. of hot acetone, is added to a solution of 31.3 g. (0.27 mole) of maleic acid in 250 ml. of hot acetone. The precipitated crude product is collected and recrystallized from ethanol to give the pure compound of the example, melting at 162°–163° C., with decomposition.

EXAMPLE 2

*Preparation of 1-(3-dimethylaminopropyl)-4-(2-methoxyphenyl)-piperazine dimaleate*

The subject compound is prepared by the procedure of Example 1, an equimolar quantity of 1-(2-methoxyphenyl)-piperazine dihydrochloride replacing the 1-(4-methoxyphenyl)-piperazine dihydrochloride. The compound is obtained as a white solid, melting at 164°–166° C. with decomposition.

EXAMPLE 3

*Preparation of 1-(3-dimethylaminopropyl)-4-(3-methoxyphenyl)-piperazine dimaleate*

The subject compound is prepared by the procedure of Example 1, an equimolar quantity of 1-(3-methoxyphenyl)-piperazine dihydrochloride replacing the 1-(4-methoxyphenyl)-piperazine dihydrochloride. The white solid melts at 161°–162° C. with decomposition.

EXAMPLE 4

*Preparation of 1-(3-dimethylaminopropyl)-4-(4-hydroxyphenyl)-piperazine*

The free base of the compound of Example 1, 17.7 g. (0.063 mole), is added carefully to 150 ml. of 40% aqueous hydrobromic acid. The solution is then refluxed for twenty hours, and evaporated to dryness. The solid residue is treated with excess 20% aqueous potassium carbonate solution and extracted with three 125 ml. portions of chloroform. The combined chloroform extracts are evaporated to dryness and the crude subject compound purified by recrystallization from 500 ml. of ethyl acetate, melting point 132°–135° C.

EXAMPLE 5

*Preparation of 1-(3-dimethylaminopropyl)-4-(4-n-butoxyphenyl)-piperazine trimaleate*

A suspension of 2.63 g. (0.01 mole) of 1-(3-dimethylaminopropyl)-4-(4-hydroxyphenyl)piperazine (Example 5) is added to a suspension of 0.29 g. (0.012 mole) of sodium hydride in 50 ml. of toluene. The mixture is refluxed for two hours under a nitrogen atmosphere. A solution of 1.6 g. (0.012 mole) of n-butyl bromide in 20 ml. of toluene is then added, and refluxing continued for twenty hours. After cooling the mixture is washed with 50 ml. of 20% aqueous sodium hydroxide solution. Removal of the toluene under reduced pressure leaves the crude free base of the subject compound. This is taken up in 50 ml. of ethanol and added to 7.0 g. (0.06 mole) of maleic acid in 50 ml. of ethanol. The precipitated subject compound is then collected; melting point 148°–150° C. with decomposition.

EXAMPLE 6

*Preparation of 1-(3-dimethylaminopropyl)-4-(4-isopropoxyphenyl)-piperazine difumarate*

The free base of the subject compound is prepared as in Example 6, an equimolar quantity of isopropyl bromide replacing the n-butyl bromide. The difumarate salt melts at 213°–216° C. with decomposition.

EXAMPLE 7

*Preparation of 1-(3-dimethylaminopropyl)-4-(4-n-dodecyloxyphenyl)-piperazine*

The subject compound is prepared by the procedure of Example 6, an equimolar quantity of n-dodecyl bromide replacing the n-butyl bromide. The compound melts at 62°–63° C.

EXAMPLE 8

*Preparation of 1-(3-dimethylaminopropyl)-4-(4-chlorophenyl)-piperazine dimaleate*

The subject compound is prepared by the method of Example 1, an equimolar quantity of 1-(4-chlorophenyl)-piperazine dihydrochloride replacing the 1-(4-methoxyphenyl)-piperazine dihydrochloride. The pure compound melts at 156.5°–157.5° C.

EXAMPLE 9

*Preparation of 1-(3-dimethylaminopropyl)-4-(2-chlorophenyl)-piperazine dimaleate*

The subject compound is prepared by the method of Example 1, an equimolar quantity of 1-(2-chlorophenyl)-piperazine dihydrochloride replacing the 1-(4-methoxyphenyl)- piperazine dihydrochloride. The pure compound melts at 175°–177° C. with decomposition.

EXAMPLE 10

*Preparation of 1-(3-dimethylaminopropyl)-4-(3-chlorophenyl)-piperazine dimaleate*

The subject compound is prepared by the method of Example 1, an equimolar quantity of 1-(3-chlorophenyl)-piperazine dihydrochloride replacing the 1-(4-methoxyphenyl)-piperazine dihydrochloride. The pure compound melts at 172°–173° C. with decomposition.

EXAMPLE 11

*Preparation of 1-(3-dimethylaminopropyl)-4-(o-tolyl) piperazine dimaleate*

The subject compound is prepared by the procedure of Example 1, an equimolar quantity of 1-(o-tolyl)piperazine dihydrochloride replacing the 1-(4-methoxyphenyl) piperazine dihydrochloride. The pure compound melts at 184°–185° C. with decomposition.

EXAMPLE 12

*Preparation of 1-(3-dimethylaminopropyl)-4-(m-tolyl) piperazine dimaleate*

The subject compound is prepared by the procedure of Example 1, an equimolar quantity of 1-(m-tolyl)piperazine dihydrochloride replacing the 1-(4-methoxyphenyl) piperazine dihydrochloride. The pure compound melts at 173°–174° C. with decomposition.

EXAMPLE 13

*Preparation of 1-(3-dimethylaminopropyl)-4-(p-tolyl) piperazine dimaleate*

The subject compound is prepared by the method of Example 1, an equimolar quantity of 1-(p-tolyl)piperazine dihydrochloride replacing the 1-(4-methoxyphenyl) piperazine dihydrochloride. The pure compound melts at 171°–172° C. with decomposition.

EXAMPLE 14

*Preparation of 1-(3-dimethylaminopropyl)-4-(3-chloro-p-tolyl)-piperazine dimaleate*

The preparation of the subject compound is carried out by the procedure of Example 1, an equimolar quantity of 1-(3-chloro-p-tolyl)piperazine replacing the 1-(4-methoxyphenyl)-piperazine dihydrochloride. The pure compound melts at 170°–171° C. with decomposition.

EXAMPLE 15

*Preparation of 1-(3-dimethylaminopropyl)-4-(4-nitrophenyl)-piperazine*

A mixture of 100 g. (0.71 mole) of 4-nitrofluorobenzene, 121.5 g. (0.71 mole) of 1-(3-dimethylaminopropyl)-piperazine, 71.5 g. (0.85 mole) of sodium bicarbonate and 500 ml. of methyl cellosolve is stirred at reflux for twenty-four hours. After cooling and clarification, the filtrate is concentrated to dryness under reduced pressure. The orange-red solid is taken up in 400 ml. of benzene and washed with water. Removal of the benzene leaves the subject compound as an orange-red solid melting at 84°–86° C.

The 4-nitrofluorobenzene may be replaced, if desired, by the corresponding chloro, bromo, or iodo derivative.

EXAMPLE 16

*Preparation of 1-(3-dimethylaminopropyl)-4-(4-nitrophenyl)-piperazine*

A mixture of 2.1 g. (0.01 mole) of 1-(4-nitrophenyl) piperazine, 2.0 g. (0.0125 mole) of 3-dimethylaminopropyl chloride dihydrochloride, 2.5 g. (0.03 mole) of sodium bicarbonate, and 100 ml. of n-butanol is refluxed for twenty-four hours. After cooling and clarification, the filtrate is concentrated to dryness under reduced pressure. The orange-red residue is taken up in benzene and washed with water. Removal of the benzene leaves the subject compound, melting point 84°–86° C. identical to that obtained in Example 15.

EXAMPLE 17

*Preparation of 1-(3-dimethylaminopropyl)-4-(2-nitrophenyl)-piperazine dimaleate*

The free base of the subject compound is prepared by following the procedure of Example 15, an equimolar quantity of 2-nitrofluorobenzene replacing the 4-nitrofluorobenze. The dimaleate solid melts at 155°–158° C. with decomposition.

EXAMPLE 18

*Preparation of 1-(3-dimethylaminopropyl)-4-(2,4-dinitrophenyl)-piperazine dihydrochloride*

The free base of the subject compound is prepared by following the procedure of Example 15, using an equimolar quantity of 1-chloro-2,4-dinitrobenzene in place of the 4-nitrofluorobenzene. The dihydrochloride is a bright yellow solid melting at 243°–244° C. with decomposition.

EXAMPLE 19

*Preparation of 1-(3-dimethylaminopropyl)-4-(2-nitro-4-carbomethoxyphenyl)piperazine dimaleate*

The free base of the subject compound is prepared by following the method of Example 1, an equimolar quantity of methyl 4-chloro-3-nitrobenzoate replacing the 4-nitrofluorobenzene. The dimaleate salt is a pale yellow solid melting at 162°–163° C.

EXAMPLE 20

*Preparation of 1-(3-dimethylaminopropyl)-4-(4-nitro-1-naphthyl)piperazine dimaleate*

The free base of the subject compound is prepared by the procedure of Example 15, an equimolar quantity of 1-iodo-4-nitronaphthalene replacing the 4-nitrofluorobenzene. The dimaleate salt is a deep yellow solid melting at 158°–159° C.

EXAMPLE 21

*Preparation of 1-(3-dimethylaminophenyl)-4-(2,4,6-trinitrophenyl)piperazine hydrochloride*

A solution of 5.0 g. (0.03 mole) of 1-(3-dimethylaminopropyl)piperazine in 50 ml. of diethyl ether is mixed with a solution of 7.5 g. (0.03 mole) of picryl chloride in 300 ml. of diethyl ether. A precipitate is formed at once. After thirty minutes, it is collected and recrystallized from methanol to give the pure compound melting at 218°–220° C. with decomposition.

EXAMPLE 22

*Preparation of 1-(3-dimethylaminopropyl)-4-(4-nitro-m-tolyl)piperazine*

The subject compound is prepared by the procedure of Example 15, an equimolar quantity of 5-fluoro-2-nitrotoluene replacing the 4-nitrofluorobenzene. The compound is a dull yellow solid melting below 50° C.

EXAMPLE 23

*Preparation of 1-(3-dimethylaminopropyl)-4-(4-aminophenyl)piperazine tetrahydrochloride*

A solution of 7.3 g. (0.025 mole) of 1-(3-dimethylaminopropyl)-4-(4-nitrophenyl)-piperazine (Example 15) in 250 ml. of ethyl acetate is reduced with hydrogen under three atmospheres of pressure in the presence of 500 mg. of platinum oxide. When the uptake of hydrogen is completed, the mixture is filtered to remove the catalyst. Addition of 3.65 g. (0.10 mole) of dry hydrogen chloride precipitates the subject compound as the tetrahydrochloride salt, melting at 210°–214° C. with decomposition.

EXAMPLE 24

*Preparation of 1-(3-dimethylaminopropyl)-4-(4-acetamidophenyl)piperazine dimaleate*

A solution of 6.6 g. (0.025 mole) of 1-(3-dimethylaminopropyl)-4-(4-aminophenyl)-piperazine in 250 ml. of ethyl acetate, prepared as in Example 23, is treated with three molar equivalents of acetic anhydride, and the mixture then refluxed for two hours. The excess acetic anhydride and the solvent are removed under reduced pressure. The residual oil is dissolved in 100 ml. of ethanol and added to a solution of 7.0 g. (0.06 mole) of maleic acid in 100 ml. of ethanol. After cooling at 4° C., the precipitate is collected and recrystallized from ethanol to give the subject compound melting at 147°–149° C.

EXAMPLE 25

*Preparation of 1-(3-dimethylaminopropyl)-4-(4-acetamido-m-tolyl)piperazine dimaleate*

1-(3-dimethylaminopropyl)-4-(4-nitro-m-tolyl) - piperazine (Example 22) is converted to the subject compound by the procedures employed in Examples 24 and 25. The compound melts at 111°–113° C. with decomposition.

EXAMPLE 26

*Preparation of 1-(3-dimethylaminopropyl)-4-(4-acetamido-1-naphthyl)piperazine dimaleate*

1-(3-dimethylaminopropyl)-4-(4-nitro - 1 - naphthyl) piperazine, the free base of Example 20 is converted to the subject compound essentially by the procedures of Examples 24 and 25. The compound melts at 153°–155° C.

EXAMPLE 27

*Preparation of 1-(3-dimethylaminopropyl)-4-(2-acetamido-4-carbomethoxyphenyl)piperazine*

1 - (3 - dimethylaminopropyl) - 4 - (2-nitro-4-carbomethoxyphenyl)piperazine, the free base of Example 19, is converted into the subject compound by the methods employed in Examples 24 and 25. The compound melts at 95°–103° C. with decomposition.

EXAMPLE 28

*Preparation of 1-(3-dimethylaminopropyl)-4-(4-chloroacetamidophenyl)piperazine dihydrochloride*

A solution of 6.6 g. (0.025 mole) of 1-(3-dimethylaminopropyl)-4-(4 - aminophenyl)piperazine (Example 23, free base) in 100 ml. of ethyl acetate is treated with a solution of 4.25 g. (0.0375 mole) of chloracetyl chloride in 100 ml. of ethyl acetate. A precipitate forms at once. After standing at room temperature for three hours, the mixture is treated with 1.0 g. of anhydrous hydrogen chloride dissolved in 4 ml. of isopropanol. The mixture is shaken vigorously, the solid collected and recrystallized from methanol to yield the subject compound, melting at 245° C. with decomposition.

EXAMPLE 29

*Preparation of 1-(3-dimethylaminopropyl)-4-(4-dichloroacetamidophenyl)piperazine dihydrochloride*

The subject compound is prepared by the method of Example 28, an equimolar quantity of dichloracetyl chloride replacing the chloracetyl chloride. The pure compound melts at 250°–252° C. with decomposition.

EXAMPLE 30

*Preparation of 1-(3-dimethylaminopropyl)-4-(4-trichloracetamidophenyl)piperazine dihydrochloride*

The subject compound is prepared by the method of Example 28, an equimolar quantity of trichloracetyl chloride replacing the chloracetyl chloride. The compound melts at 278° C. with decomposition.

EXAMPLE 31

*Preparation of 1-(3-dimethylaminopropyl)-4-(4-lauramidophenyl)piperazine dimaleate*

The dihydrochloride salt analog of the subject compound is prepared by the method of Example 28, an equimolar quantity of lauroyl chloride replacing the chloracetyl chloride. The dihydrochloride salt is converted to the free base and thence to the dimaleate salt, melting at 156.5°–157.5° C. with decomposition.

EXAMPLE 32

*Preparation of 1-(3-dimethylaminopropyl)-4-(4-carbethoxyaminophenyl)piperazine dimaleate*

The subject compound is prepared by the reaction sequence employed in Example 31, an equimolar quantity of ethyl chloroformate replacing the lauroyl chloride. The compound melts at 167° C. with decomposition.

EXAMPLE 33

*Preparation of 1-(3-dimethylaminopropyl)-4-(4-benzamidophenyl)piperazine dimaleate*

The subject compound is prepared by the reaction sequence employed in Example 31, an equimolar quantity of benzoyl chloride replacing the lauroyl chloride. The compound melts at 182°–183° C. with decomposition.

EXAMPLE 34

*Preparation of 1-(3-dimethylaminopropyl)-4-[4-(2-phenyl-2H-1,2,3 - triazole-4-carbonamido)phenyl]piperazine dimaleate*

The subject compound is prepared by the reaction sequence of Example 31, an equimolar quantity of 2-phenyl-2H-1,2,3-triazole-4-carbonyl chloride replacing the lauroyl chloride. The compound melts at 180°–181° C.

EXAMPLE 35

*Preparation of 1-(3-dimethylaminopropyl)-4-(4-maleamidophenyl)-piperazine maleate*

A solution of 13.1 g. (0.05 mole) of 1-(3-dimethylaminopropyl)-4-(4-aminophenyl)piperazine (Example 33, free base) in 150 ml. of ethyl acetate and a solution of 16.7 g. (0.17 mole) of maleic anhydride in 100 ml. of toluene are combined and heated in an open vessel on the steam bath for two hours. The ethyl acetate is boiled off and replaced by an equal volume of toluene. After cooling, the solid is collected, dissolved in 100 ml. of acetone and added to a solution of 11.6 g. (0.10 mole) of maleic acid in 200 ml. of acetone. The precipitate is collected and recrystallization from 400 ml. of 90% aqueous ethanol to yield the subject compound, melting at 160°–164° C. with decomposition.

EXAMPLE 36

*Preparation of 1-(3-dimethylaminopropyl)-4-(4-benzenesulfonamidophenyl)piperazine*

A solution of 6.6 g. (0.025 mole) of 1-(3-dimethylaminopropyl)-4-(4-aminophenyl)piperazine (Example 23, free base) in 100 ml. of ethyl acetate is treated with 6.5 g. (0.0375 mole) of benzenesulfonyl chloride, an oily precipitate forming at once. After standing for an hour, the solvent is decanted, the oily solid dissolved in 30 ml. of water, and the solution neutralized exactly with sodium hydroxide solution. The precipitate is collected and recrystallized from ethanol to yield the subject compound, melting at 152°–153° C. with decomposition.

EXAMPLE 37

*Preparation of 1-(3-dimethylaminopropyl)-4-(4-methanesulfonamidophenyl)piperazine dimaleate*

The free base of the subject compound is prepared by the procedure of Example 36, an equimolar quantity of methanesulfonyl chloride replacing the benzenesulfonyl chloride. The dimaleate salt melts at 148°–150° C. with decomposition.

EXAMPLE 38

*Preparation of 1-(3-dimethylaminopropyl)-4-[3-(2-naphthalenesulfonamido)phenyl]piperazine dimaleate*

The free base of the subject compound is prepared by the procedure of Example 36, an equimolar quantity of 2-naphthalenesulfonyl chloride replacing the benzenesulfonyl chloride. The dimaleate salt melts at 120°–123° C. with decomposition.

EXAMPLE 39

*Preparation of 1 - (3 - dimethylaminopropyl) - 4 - [4-(2,3 - dichlorobenzenesulfonamido)phenyl]piperazine dimaleate*

The free base of the subject compound is prepared by the procedure of Example 36, an equimolar quantity of 2,3-dichlorobenzenesulfonyl chloride replacing the benzenesulfonyl chloride. The dimaleate salt melts at 120° C. with decomposition.

EXAMPLE 40

*Preparation of 1 - (3 - dimethylaminopropyl) - 4 - [4-(2,5 - dichlorobenzenesulfonamido)phenyl]piperazine dimaleate*

The free base of the subject compound is prepared by the procedure of Example 36, an equimolar quantity of 2,5-dichlorobenzenesulfonyl chloride replacing the benzenesulfonyl chloride. The dimaleate salt melts at 146°–147° C. with decomposition.

EXAMPLE 41

*Preparation of 1 - (3 - dimethylaminopropyl) - 4 - [4-(3,4 - dichlorobenzenesulfonamido)phenyl]piperazine dimaleate*

The free base of the subject compound is prepared by the procedure of Example 36, an equimolar quantity of 3,4-dichlorobenzenesulfonyl chloride replacing the benzenesulfonyl chloride. The dimaleate salt melts at 122°–124° C. with decomposition.

EXAMPLE 42

*Preparation of 1 - (3 - dimethylaminopropyl) - 4 - [4-(2,3,4 - trichlorobenzenesulfonamido)phenyl]piperazine dimaleate*

The free base of the subject compound is prepared by the procedure of Example 36, an equimolar quantity of 2,3,4-trichlorobenzenesulfonyl chloride replacing the benzenesulfonyl chloride. The dimaleate salt melts at 160°–163° C. with decomposition.

EXAMPLE 43

*Preparation of 1 - (3 - dimethylaminopropyl) - 4 - [4-(2,3,5,6 - tetrachlorobenzenesulfonamido)phenyl]piperazine dimaleates*

The free base of the subject compound is prepared by the procedure of Example 36, an equimolar quantity of 2,3,5,6-tetrachlorobenzenesulfonyl chloride replacing the benzenesulfonyl chloride. The dimaleate salt melts at 173°–174° C. with decomposition.

EXAMPLE 44

*Preparation of 1 - (3 - dimethylaminopropyl) - 4 - [4-(2-nitro - 4 - chlorobenzenesulfonamido)phenyl]piperazine dimaleate*

The free base of the subject compound is prepared by hte procedure of Example 36, an equimolar quantity of 2-nitro-4-chlorobenzenesulfonyl chloride replacing the benzenesulfonyl chloride. The dimaleate salt melts at 170°–171° C. with decomposition.

EXAMPLE 45

*Preparation of 2-(3-dimethylaminopropyl)-4-[(4-nitrobenzenesulfonamido)phenyl]piperazine dimaleate*

The free base of the subject compound is prepared by the procedure of Example 36, an equimolar quantity of 4-nitrobenzenesulfonyl chloride replacing the benzenesulfonyl chloride. The dimaleate salt melts at 104°–110° C. with decomposition.

EXAMPLE 46

*Preparation of 1-(3-dimethylaminopropyl)-4-[4-aminobenzenesulfonamido)phenyl]piperazine dimaleate*

The free base of the subject compound is prepared by the reduction of the free base of Example 45. The dimaleate salt melts at 93°–97° C. with decomposition.

EXAMPLE 47

*Preparation of 4-[4-(3-dimethylaminopropyl)-1-piperazinyl]-thiocarbanilide*

A mixture of 6.1 g. (0.015 mole) of 1-(3-dimethylaminopropyl)-4-(4 - aminophenyl)piperazine tetrahydrochloride (Example 23), 3 ml. (excess) of phenylisothiocyanate, 5.0 g. (0.06 mole) of sodium bicarbonate, 4 ml. of water, and 400 ml. of acetone are combined and refluxed for six hours. The insolubles are filtered out, and the filtrate yields a precipitate upon cooling at −10° C. concentration of the filtrate gives a second crop of crystals. Recrystallization from aqueous methanol gives the pure subject compound, melting at 130°–131° C.

EXAMPLE 48

*Preparation of 4-[4-(3-dimethylaminopropyl)-1-piperazinyl]-carbanilide dimaleate*

A solution of 7.8 g. (0.03 mole) of 1-(3-dimethylaminopropyl)-4-(4-aminophenyl)piperazine (Example 23, free base) in 150 ml. of dioxane is treated with 4 ml. (excess) of phenyl isocyanate. The mixture is warmed at 100° C. for one hour and then cooled. The precipitate is collected, dissolved in 300 ml. of acetone and added to a solution of 10 g. (0.086 mole) of maleic acid in 200 ml. of acetone. After cooling, the precipitate is collected and recrystallized from methanol. The pure compound melts at 161°–162° C.

EXAMPLE 49

*Preparation of 1-(3-dimethylaminopropyl)4-ureidophenylpiperazine dimaleate*

A solution of 8.2 g. (0.02 mole) of 1-(3-dimethylaminopropyl)-4-(4 - aminophenyl)piperazine tetrahydrochloride (Example 23) in 50 ml. of warm water is treated with a solution of 2.0 g. (0.025 mole) of potassium cyanate in 10 ml. of warm water. The solution is neutralized with sodium hydroxide after twenty-four hours, the precipitate collected and dried under reduced pressure. It is dissolved in 200 ml. of acetone and added to 11.6 g. (0.1 mole) of maleic acid dissolved in 150 ml. of acetone. The oily precipitate crystallizes after standing at 4° C. overnight. It is collected and recrystallized from ethanol, giving the pure compound melting at 163–164° C. with decomposition.

EXAMPLE 50

*Preparation of 1-(3-dimethylaminopropyl)-4-phenylpiperazine trihydrochloride*

A mixture of 32.4 g. (0.20 mole) of 1-phenylpiperazine, 40 g. (0.25 mole) of 3-dimethylaminopropyl chloride hydrochloride, 50 g. (0.6 mole) of sodium bicarbonate, and 250 ml. of ethanol is stirred at reflux for sixteen hours. The inorganic salts are removed by filtration. Removal of the ethanol under reduced pressure gives a viscous oil, which is subjected to vacuum distillation at 3 mm. of pressure. The 1-(3-dimethylaminopropyl)-4-phenylpiperazine is collected at 180°–182° C.

A sample of the free base dissolved in dry ether and heated with hydrogen chloride gives the trihydrochloride salt, melting at 235°–240° C. with decomposition.

EXAMPLE 51

*Preparation of 1-(3-dimethylaminopropyl)-4-(4-nitrophenyl)-trans-2,5-dimethylpiperazine dihydrochloride*

The free base of the subject compound is prepared by the procedure of Example 16, an equimolar quantity of 1-(3 - dimethylaminopropyl)-trans-2,5-dimethylpiperazine replacing the 1-(3-dimethylaminopropyl)piperazine. The dihydrochloride is a bright yellow solid decomposing above 230° C.

EXAMPLE 52

*Preparation of 1-(4-dimethylaminobutyl)-4-(4-nitrophenyl)-piperazine dimaleate*

The free base of the subject compound is essentially prepared by the procedure of Example 16, an equimolar quantity of 1-(4-dimethylaminobutyl)piperazine replacing the 1-(3-dimethylaminopropyl)piperazine. The dimaleate salt melts at 147°–148° C.

EXAMPLE 53

*Preparation of 1-(4-dimethylaminobutyl)-4-(4-nitrophenyl)-trans-2,5-dimethylpiperazine dihydrochloride*

The preparation of the free base of the subject compound is carried out by the procedure of Example 16, an equimolar quantity of 1-(4-dimethylaminobutyl)-trans-2,5-dimethylpiperazine replacing the 1-(3-dimethylaminopropyl)-piperazine. The dihydrochloride salt melts at 237–240° C. with decomposition.

EXAMPLE 54

*Preparation of 1-(3-dimethylaminopropyl)-4-(4-acetamidophenyl)-piperazine dimaleate*

The free base of the subject compound is prepared by the procedure of Example 16, an equimolar quantity of 1-(4-acetamidophenyl)piperazine dihydrochloride replacing the 1-(4-nitrophenyl)piperazine. The dimaleate salt melts at 147°–149° C. and is identical with the product prepared in Example 24.

EXAMPLES 55–64

*(General procedure)*

A mixture of 5.92 g. (0.02 mole) of 4'-[4-(3-chloropropyl)-1-piperazinyl]acetanilide, the secondary amine (0.022 to 0.030 mole), 4.2 g. (0.05 mole) of sodium bicarbonate and 250 ml. of ethanol is magnetically stirred at reflux for 17 to 24 hours. The completion of the reaction is checked by chromatography on Alumina G thin layer plates using methanolbenzene (1:9) as the solvent. The reaction mixture is cooled and filtered. The solvent is evaporated, and the residue is partitioned between chloroform and 1 N sodium hydroxide solution. The chloroform is washed with water, dried, decolorized and evaporated to leave the free base which is usually crystalline. The crystalline residue is triturated with hexane to remove any excess amine and the free base is collected by filtration and air-dried. The free base is then dissolved in acetone (100 ml.), and the solution is added to a warm solution of 5.0 g. (0.043 mole) of maleic acid in 50 ml. of acetone. The mixture is cooled, and the white maleate salt is collected, dried and recrystallized. The recrystallization solvents and melting points for these amino derivatives are presented in Table A.

TABLE A

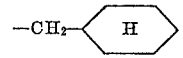

| $R_3$ | Recrystallization Solvent | M.P., ° C. |
|---|---|---|
| 55. $CH_2CH_3$ | Ethanol | 134–5 |
| 56. $(CH_2)_2CH_3$ | do | 129–31 |
| 57. $(CH_2)_3CH_3$ | Methanol-acetone | 131–3 |
| 58. $CH_2CH(CH_3)_2$ | Ethanol | 145–7 |
| 59. $(CH_2)_4CH_3$ | Ethanol-acetone | 130–2 |
| 60. $(CH_2)_5CH_3$ | do | 140–1 |
| 61. $(CH_2)_7CH_3$ | Ethanol | 138–9 |
| 62. $CH_2C_6H_5$ | do | 164–6 |
| 63. $CH_2CH_2C_6H_5$ | do | 159–61 |
| 64. 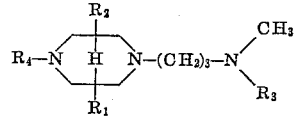 | do | 165–7 |

NOTE.—All compounds as dimaleate salts.

We claim:
1. A piperazine of the group consisting of those having the formula:

$$R_4-N\underset{R_1}{\overset{R_2}{\diagup\!\!\!\diagdown}}N-(CH_2)_3-N\diagup\!\!\!\diagdown\genfrac{}{}{0pt}{}{CH_3}{R_3}$$

wherein $R_1$ and $R_2$ are selected from the group consisting of hydrogen and lower alkyl, $R_3$ is selected from the group consisting of alkyl of 1 to 8 carbons, lower alkyl phenyl and cyclohexyl and $R_4$ is selected from the group consisting of nitrophenyl, dinitrophenyl, trinitrophenyl, aminophenyl, nitrocarbomethoxyphenyl, nitronaphthyl, nitro lower alkylphenyl, acetamidophenyl, acetamido lower alkylphenyl, acetamidonaphthyl, acetamidocarbomethoxyphenyl, chloroacetamidophenyl, dichloroacetamidophenyl, trichloroacetamidophenyl, lauramidophenyl, carbloweralkoxyaminophenyl, benzamidophenyl, phenyltriazolecarboxamidophenyl, maleamidophenyl, benzenesulfonamidophenyl, methanesulfonamidophenyl, naphthalenesulfonamidophenyl, dichlorobenzenesulfonamidophenyl, trichlorobenzenesulfonamidophenyl, tetrachlorobenzenesulfonamidophenyl, aminobenzenesulfonamidophenyl, nitrobenzenesulfonamidophenyl, nitrochlorobenzenesulfonamidophenyl, thiocarbanilide, carbanilide loweralkoxyphenyl, and ureidophenyl, and pharmaceutically acceptable acid addition salts.

2. A piperazine according to claim 1, of the formula:

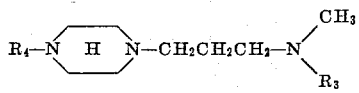

wherein $R_3$ is alkyl of 1 to 8 carbons and $R_4$ is acetamidophenyl.

3. A piperazine according to claim 1, of the formula:

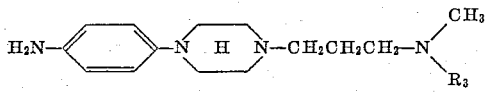

wherein $R_3$ is alkyl of 1 to 8 carbons.

4. The piperazine according to claim 1, 1-(3-dimethylaminopropyl)-4-(nitrophenyl)piperazine.

5. The piperazine according to claim 1, 1-(3-dimethylaminopropyl) - 4 - (4 - aminophenyl)piperazine tetrahydrochloride.

6. The piperazine according to claim 1, 1-(3-dimethylaminopropyl) - 4 - (4 - acetamidophenyl)piperazine dimaleate.

7. The piperazine according to claim 1, 1-(3-dimethylaminopropyl) - 4 - (4-carbethoxyaminophenyl)piperazine dimaleate.

8. The piperazine according to claim 1, 1-(3-dimethylaminopropyl) - 4 - (4-benzamidophenyl)piperazine dimaleate.

9. The piperazine according to claim 1, 1-(3-dimethylaminopropyl) - 4 - (4-methoxyphenyl)piperazine.

No references cited.

ALEX MAZEL, *Primary Examiner.*

HENRY R. JILES, *Examiner.*